US008485895B2

(12) United States Patent
Okada

(10) Patent No.: US 8,485,895 B2
(45) Date of Patent: Jul. 16, 2013

(54) GAME SERVER, GAME MACHINE UNDER CONTROL OF THE SERVER, AND GAME CONTROL METHOD EXECUTING RETURN ON JUDGMENT THAT CUMULATIVE CREDIT CONSUMPTION REACHES UPPER LIMIT

(75) Inventor: Kazuo Okada, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 669 days.

(21) Appl. No.: 12/183,721

(22) Filed: Jul. 31, 2008

(65) Prior Publication Data

US 2008/0293497 A1 Nov. 27, 2008

Related U.S. Application Data

(63) Continuation of application No. 10/272,940, filed on Oct. 18, 2002, now abandoned.

(30) Foreign Application Priority Data

Oct. 22, 2001 (JP) ................................ 2001-324082

(51) Int. Cl.
*A63F 13/10* (2006.01)
*A63F 13/12* (2006.01)
*G07F 17/32* (2006.01)

(52) U.S. Cl.
CPC ........ *G07F 17/3258* (2013.01); *G07F 17/3234* (2013.01); *G07F 17/3225* (2013.01)
USPC ................................. 463/27; 463/25; 463/42

(58) Field of Classification Search
CPC .............. G07F 17/3258; G07F 17/3234; G07F 17/3225; A63F 2300/40; A63F 2300/50; A63F 2300/53; A63F 2300/55; A63F 13/10; A63F 13/12
USPC .......... 463/30, 31, 40–42, 25, 16, 20, 11–13, 463/17–19, 29, 43, 27
See application file for complete search history.

(56) References Cited

U.S. PATENT DOCUMENTS 4,283,709 A 8/1981 Lucero et al.
4,524,459 A 6/1985 Titchenal (Continued)

FOREIGN PATENT DOCUMENTS

DE 3242890 A1 5/1984
DE 3712841 A1 11/1988

(Continued)

OTHER PUBLICATIONS

Office Action mailed Dec. 10, 2010, in co-pending U.S. Appl. No. 12/183,720.

(Continued)

*Primary Examiner* — David L Lewis
*Assistant Examiner* — Matthew D. Hoel
(74) *Attorney, Agent, or Firm* — Lexyoume IP Meister, PLLC.

(57) ABSTRACT

A game server controls plural game machine groups including a collection of game machines, each of which is brought into a status enabling to start a game based on a thrown coin or a given credit number and is given a payout according to a result of the game. The game server includes a processing unit that judges whether a cumulative credit consumption of a predetermined game machine group reaches a predetermined upper limit, based on information about credit consumptions of the plural game machine groups. The game server also includes a communication interface that sends, when the processing unit judges that the cumulative credit consumption of the predetermined game machine group reaches the predetermined upper limit, a return signal for executing a return based on a predetermined return rate, to one game machine of the predetermined game machine group. The return is executed regardless of a game result.

16 Claims, 10 Drawing Sheets

| MACHINE GROUP NUMBER | PAYOUT UPPER LIMIT (IN THOUSANDS OF YEN) | RETURN RATE(%) | UPPER LIMIT ARRIVAL |
|---|---|---|---|
| G01 | 100 | 10 | 1 |
| G02 | 700 | 20 | 0 |
| G03 | 300 | 15 | 0 |
| G04 | 1000 | 70 | 1 |
| G05 | 400 | 15 | 0 |
| ⋮ | ⋮ | ⋮ | ⋮ |
| G09 | 500 | 110 | 1 |
| G10 | 300 | 30 | 0 |

U.S. PATENT DOCUMENTS

| | | | | |
|---|---|---|---|---|
| 4,624,459 | A | 11/1986 | Kaufman | |
| 4,652,998 | A | 3/1987 | Koza et al. | |
| 4,657,256 | A | 4/1987 | Okada | |
| 4,669,731 | A | 6/1987 | Clarke | |
| 4,718,672 | A | 1/1988 | Okada | |
| 4,775,937 | A | 10/1988 | Bell | |
| 4,837,728 | A | 6/1989 | Barrie et al. | |
| 4,964,638 | A | 10/1990 | Ishida | |
| 4,993,713 | A | 2/1991 | Harada | |
| 5,010,995 | A | 4/1991 | Okada | |
| 5,178,390 | A | 1/1993 | Okada | |
| 5,229,764 | A | 7/1993 | Matchett et al. | |
| 5,280,909 | A | 1/1994 | Tracy | |
| 5,429,361 | A | 7/1995 | Raven et al. | |
| 5,564,700 | A | 10/1996 | Celona | |
| 5,611,730 | A | 3/1997 | Weiss | |
| 5,639,088 | A | 6/1997 | Schneider et al. | |
| 5,655,961 | A | 8/1997 | Acres et al. | |
| 5,674,128 | A | 10/1997 | Holch et al. | |
| 5,695,402 | A | 12/1997 | Stupak | |
| 5,702,303 | A | 12/1997 | Takemoto et al. | |
| 5,768,382 | A | 6/1998 | Schneier et al. | |
| 5,770,533 | A | 6/1998 | Franchi | |
| 5,810,665 | A | 9/1998 | Takemoto et al. | |
| 5,820,459 | A | 10/1998 | Acres et al. | |
| 5,836,817 | A | 11/1998 | Acres et al. | |
| 5,836,819 | A | 11/1998 | Ugawa | |
| 5,884,274 | A | 3/1999 | Walker et al. | |
| 5,890,963 | A | 4/1999 | Yen | |
| 5,910,048 | A | 6/1999 | Feinberg | |
| 6,001,016 | A | 12/1999 | Walker et al. | |
| 6,003,013 | A | 12/1999 | Boushy et al. | |
| 6,018,718 | A | 1/2000 | Walker et al. | |
| 6,089,980 | A | 7/2000 | Gauselmann | |
| 6,110,043 | A * | 8/2000 | Olsen .............................. | 463/27 |
| 6,113,493 | A | 9/2000 | Walker et al. | |
| 6,135,884 | A | 10/2000 | Hedrick et al. | |
| 6,196,547 | B1 | 3/2001 | Pascal et al. | |
| 6,224,482 | B1 | 5/2001 | Bennett | |
| 6,234,896 | B1 | 5/2001 | Walker et al. | |
| 6,241,608 | B1 | 6/2001 | Torango | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,312,333 | B1 | 11/2001 | Acres | |
| 6,319,125 | B1 * | 11/2001 | Acres .............................. | 463/25 |
| 6,409,602 | B1 | 6/2002 | Wiltshire et al. | |
| 6,439,995 | B1 | 8/2002 | Hughs-Baird et al. | |
| 6,471,591 | B1 * | 10/2002 | Crumby .......................... | 463/26 |
| 6,517,433 | B2 | 2/2003 | Loose et al. | |
| 6,575,832 | B1 * | 6/2003 | Manfredi et al. ............... | 463/25 |
| 6,626,758 | B1 | 9/2003 | Parham et al. | |
| 6,638,165 | B2 | 10/2003 | Uchiyama et al. | |
| 6,645,078 | B1 | 11/2003 | Mattice | |
| 6,695,697 | B1 | 2/2004 | Okada | |
| 6,857,958 | B2 | 2/2005 | Osawa | |
| 6,878,063 | B2 | 4/2005 | Manfredi et al. | |
| 6,932,704 | B2 | 8/2005 | Walker et al. | |
| 6,932,707 | B2 | 8/2005 | Duhamel | |
| 6,984,173 | B1 | 1/2006 | Piechowiak et al. | |
| 7,465,232 | B2 | 12/2008 | Okada | |
| 2002/0198039 | A1 | 12/2002 | Marks et al. | |
| 2003/0013516 | A1 | 1/2003 | Walker et al. | |
| 2003/0054873 | A1 | 3/2003 | Peterson | |
| 2003/0064809 | A1 | 4/2003 | Okada | |
| 2003/0064810 | A1 | 4/2003 | Okada | |
| 2003/0069067 | A1 | 4/2003 | Okada | |
| 2003/0069073 | A1 | 4/2003 | Okada | |
| 2003/0073486 | A1 | 4/2003 | Okada | |
| 2003/0073487 | A1 | 4/2003 | Okada | |
| 2003/0078095 | A1 | 4/2003 | Okada | |
| 2003/0119585 | A1 | 6/2003 | Walker et al. | |
| 2003/0220138 | A1 | 11/2003 | Walker et al. | |
| 2004/0048646 | A1 | 3/2004 | Visocnik | |
| 2005/0059480 | A1 | 3/2005 | Soukup et al. | |
| 2006/0009276 | A1 | 1/2006 | Okada | |
| 2007/0060250 | A1 | 3/2007 | Okada | |
| 2007/0060277 | A1 | 3/2007 | Okada | |
| 2007/0060278 | A1 | 3/2007 | Okada | |
| 2007/0060279 | A1 | 3/2007 | Okada | |
| 2007/0060280 | A1 | 3/2007 | Okada | |
| 2007/0060281 | A1 | 3/2007 | Okada | |
| 2007/0060282 | A1 | 3/2007 | Okada | |
| 2007/0060283 | A1 | 3/2007 | Okada | |
| 2007/0060324 | A1 | 3/2007 | Okada | |
| 2007/0105609 | A1 | 5/2007 | Okada | |
| 2007/0105621 | A1 | 5/2007 | Okada | |
| 2007/0105622 | A1 | 5/2007 | Okada | |
| 2007/0149269 | A1 | 6/2007 | Benbrahim | |
| 2008/0058050 | A1 | 3/2008 | Okada | |
| 2008/0058066 | A1 | 3/2008 | Okada | |
| 2008/0064473 | A1 | 3/2008 | Okada | |
| 2008/0064474 | A1 | 3/2008 | Okada | |
| 2008/0064475 | A1 | 3/2008 | Okada | |
| 2008/0064476 | A1 | 3/2008 | Okada | |
| 2008/0096632 | A1 | 4/2008 | Okada | |
| 2008/0102922 | A1 | 5/2008 | Okada | |
| 2008/0102930 | A1 | 5/2008 | Okada | |
| 2008/0119259 | A1 | 5/2008 | Okada | |
| 2008/0119262 | A1 | 5/2008 | Okada | |
| 2008/0125216 | A1 | 5/2008 | Okada | |
| 2008/0139287 | A1 | 6/2008 | Okada | |
| 2008/0139291 | A1 | 6/2008 | Okada | |
| 2008/0146310 | A1 | 6/2008 | Okada | |
| 2008/0153571 | A1 | 6/2008 | Okada | |
| 2008/0161090 | A1 | 7/2008 | Okada | |
| 2008/0214275 | A1 | 9/2008 | Okada | |
| 2008/0293482 | A1 | 11/2008 | Okada | |

FOREIGN PATENT DOCUMENTS

| | | | |
|---|---|---|---|
| DE | 4137010 | | 8/1992 |
| DE | 100 49 444 | A1 | 11/2001 |
| DK | 4137010 | | 8/1992 |
| EP | 0631798 | | 1/1995 |
| EP | 0 840 264 | A1 | 5/1998 |
| EP | 1 192 975 | A1 | 4/2002 |
| EP | 1 302 914 | A2 | 4/2003 |
| EP | 1351180 | | 10/2003 |
| EP | 1477947 | | 11/2004 |
| EP | 1 544 811 | A2 | 6/2005 |
| GB | 2326830 | | 1/1999 |
| JP | S61-118377 | U | 7/1986 |
| JP | H04-244178 | A | 9/1992 |
| JP | 6-70951 | | 3/1994 |
| JP | H06-079051 | A | 3/1994 |
| JP | 07-171262 | | 7/1995 |
| JP | 07-299234 | | 11/1995 |
| JP | 8-24401 | | 1/1996 |
| JP | H08-29169 | B | 3/1996 |
| JP | 08-336657 | | 12/1996 |
| JP | 9-28905 | | 2/1997 |
| JP | 09-094340 | | 4/1997 |
| JP | 09-103576 | | 4/1997 |
| JP | 09-264777 | | 10/1997 |
| JP | 10-33820 | | 2/1998 |
| JP | 10-94666 | | 4/1998 |
| JP | 10-118247 | | 5/1998 |
| JP | 10-234945 | | 9/1998 |
| JP | 11-19276 | | 1/1999 |
| JP | 11-146938 | | 6/1999 |
| JP | 11-253640 | | 9/1999 |
| JP | 2000-342772 | | 12/2000 |
| JP | 2001-70510 | | 3/2001 |
| JP | 2001-204885 | | 7/2001 |
| JP | 2001-259205 | | 9/2001 |
| JP | 2001-269441 | | 10/2001 |
| JP | 2003-47775 | | 2/2003 |
| JP | 2003-47779 | | 2/2003 |
| JP | 2003-53041 | | 2/2003 |
| JP | 2003-53042 | | 2/2003 |
| JP | 2003-71096 | | 3/2003 |
| JP | 2003-71097 | | 3/2003 |
| JP | 2003-71098 | | 3/2003 |
| JP | 2003-111888 | | 4/2003 |
| JP | 2003-111889 | | 4/2003 |

| | | | |
|---|---|---|---|
| JP | 2003-111890 | | 4/2003 |
| JP | 2003-111891 | | 4/2003 |
| JP | 2003-111897 | | 4/2003 |
| JP | 2003-117053 | | 4/2003 |
| JP | 2003-117070 | | 4/2003 |
| JP | 2003-117071 | | 4/2003 |
| JP | 2003-117072 | | 4/2003 |
| JP | 2003-117073 | | 4/2003 |
| JP | 2003-126343 | | 5/2003 |
| JP | 2003-205072 | | 7/2003 |
| PA | 2003-47775 | | 2/2003 |
| WO | WO 03/083795 | A1 | 10/2003 |
| WO | WO-2004/095383 | | 11/2004 |

OTHER PUBLICATIONS

Office Action mailed Dec. 10, 2010, in co-pending U.S. Appl. No. 12/183,814.

Office Action mailed Oct. 12, 2010, in co-pending U.S. Appl. No. 11/734,993.

Office Action mailed Oct. 25, 2010, in co-pending U.S. Appl. No. 11/735,104.

Office Action mailed Oct. 27, 2010, in co-pending U.S. Appl. No. 11/735,062.

Office Action mailed Nov. 2, 2010, in co-pending U.S. Appl. No. 12/183,654.

"Pachi-Slot Hisshogaido", Byakuya-Shobo Co., Ltd., 7th Volume, No. 14, Oct. 1, 1996, pp. 88-89 (with English Abstract).

"Pachi-Slot Daizukan 2001" Byakuya-Shobo Co., Ltd. May 12, 2001, pp. 22, 24, 36.

Patent Abstracts of Japan, Publication No. 09264777, Publication Date—Oct. 7, 1997.

"Trick Monster 2. Pachi-Slot Hisshogaido Max 2001, Oct. 2001" Byakuya-Shobo, Oct. 1, 2001, 4 pages (With English Abstract).

Office Action mailed Aug. 27, 2010, in co-pending U.S. Appl. No. 12/183,804.

Office Action issued Dec. 14, 2010 in Japan Application No. 2007-204698.

* cited by examiner

FIG. 10

| MACHINE GROUP NUMBER | PAYOUT UPPER LIMIT (IN THOUSANDS OF YEN) | RETURN RATE(%) | UPPER LIMIT ARRIVAL |
|---|---|---|---|
| G01 | 100 | 10 | 1 |
| G02 | 700 | 20 | 0 |
| G03 | 300 | 15 | 0 |
| G04 | 1000 | 70 | 1 |
| G05 | 400 | 15 | 0 |
| ⋮ | ⋮ | ⋮ | ⋮ |
| G09 | 500 | 110 | 1 |
| G10 | 300 | 30 | 0 |

GAME SERVER, GAME MACHINE UNDER CONTROL OF THE SERVER, AND GAME CONTROL METHOD EXECUTING RETURN ON JUDGMENT THAT CUMULATIVE CREDIT CONSUMPTION REACHES UPPER LIMIT

CROSS-REFERENCE TO RELATED APPLICATIONS

This application is a continuation of prior application Ser. No. 10/272,940, filed Oct. 18, 2002 now abandoned.

BACKGROUND

1. Field of the Invention

The present invention relates to a technique of controlling a return to game machines for pachisio game (Japanese slot game), pachinko game (pinball game), etc.

2. Description of Related Art

Generally, a game machine for pachisio game, pachinko game, etc. is constructed so that a game is started when a player throws a game medium such as medal, in the game machine, and that the game medium is paid out according to the winning state (style) occurred during the game.

This game machine generates a winning state, being called "big prize," at a preset probability. Therefore, the player performs a game in expectation of a big prize on the game machine that the player is currently playing.

The game machine that produces a prize depending on the probability as described does not always produce the prize at a fixed probability. That is, it is constructed so as to converge on a preset probability when a significant number of games are digested. Therefore, (i) a prize occurs on a player performing even a small number of games, and (ii) a prize is not always guaranteed to a player despite he is performing a large number of games. With the game machine of this type, gambling characteristics can be enhanced to make the game more amusing. On the other hand, the player waiting for a prize for a long time might lose enthusiasm for the game. This leads to a tendency to miss the player (customer).

In order to solve the above circumstances, a variety of game machines have been proposed.

In a game machine disclosed in laid-open Japanese Patent Unexamined Publication No. 8-24401, there are provided two probability tables for controlling the probability of generating a big prize. In the case that the player performs a large number of games and gets tired of waiting for a prize, one of the two probability tables that has a higher probability is selected for change, thereby increasing the probability of generating the prize.

Laid-open Japanese Patent Unexamined Publication Nos. 6-79051 and 11-253640 have proposed game machines employing such means, being called "return." The term "return" means a system that when predetermined conditions are satisfied, a game medium (e.g., medal) is paid out per game machine, depending on the amount of medals that a player threw in. A return type game machine of the former further increases game characteristics by controlling the return rate as a basis for payout of game media. On the other hand, a return type game machine of the latter adjusts the probability of generating a prize in consideration of the profit rate in the game center and the return rate to each game machine.

In the game machine according to the above Publication No. 8-24401, unevenness in the probability of generating a prize can be eliminated, whereas it has poor gambling characteristics. Therefore, players are less amused by the game.

In the game machines disclosed in the above Publication Nos. 6-79051 and 11-253640, unfairness can be removed by eliminating unevenness in the probability of generating a prize per game machine, whereas it has poor gambling characteristics. Therefore, players are less amused by the game.

Meanwhile, as a technique of increasing gambling characteristics, there is the so-called "jackpot". The term "jackpot" means such a system of holding part of credits thrown in a plurality of game machines installed in a game center and then releasing the credit held in a certain game machine of the game center under predetermined conditions.

In the conventional jackpot, the probability of executing such a release to a game machine is extremely low although gambling characteristics can be increased. Therefore, because of this extremely low probability of release, the abovementioned problem is not yet solved insofar as eliminating unevenness of the probability of generating a prize.

SUMMARY OF THE INVENTION

Accordingly, it is an object of the present invention to eliminate the problem of missing customers by providing such circumstances that players can perform a game without anxiety, while enjoying amusement of the game.

The present invention is intended for collectively controlling a plurality of game machine groups, each being a collection of game machines, which are installed in a game center. At this time, when the cumulative credit consumption of one of these game machine groups reaches a predetermined upper limit, a return is executed to a game machine contained in this game machine group. As a result, when a return is executed to one game machine in a certain game machine group, the player of one game machine can draw attentions not only from players performing a game on other game machines of this game machine group, but also from players performing a game in other game machine groups. Therefore, the player who has received the return has a sense of superiority to other players.

Even when a return is less likely to occur in a game machine group to which the game machine of a player belongs, at the moment this player actually sees a return executed to other game machine group, he/she will have the intention of continuing a game until a return is executed to the game machine group that this player is currently playing. This shows liveliness in the entire game center. This also makes it possible to solve the problem of customer missing existing in the conventional game machines.

The present invention, advantage in operating the same and aims which is attained by implementing the present invention will be better appreciated from the following detailed description of illustrative embodiment thereof, and the accompanying drawings.

BRIEF DESCRIPTION OF THE DRAWINGS

FIG. 10 is a diagram showing the contents of a game table stored in database of the game server.

DETAILS DESCRIPTION OF THE PREFERRED EMBODIMENT

One preferred embodiment of the present invention will be described below in detail, based on the accompanying drawings.

[Overall Configuration of System]

Figure 1:
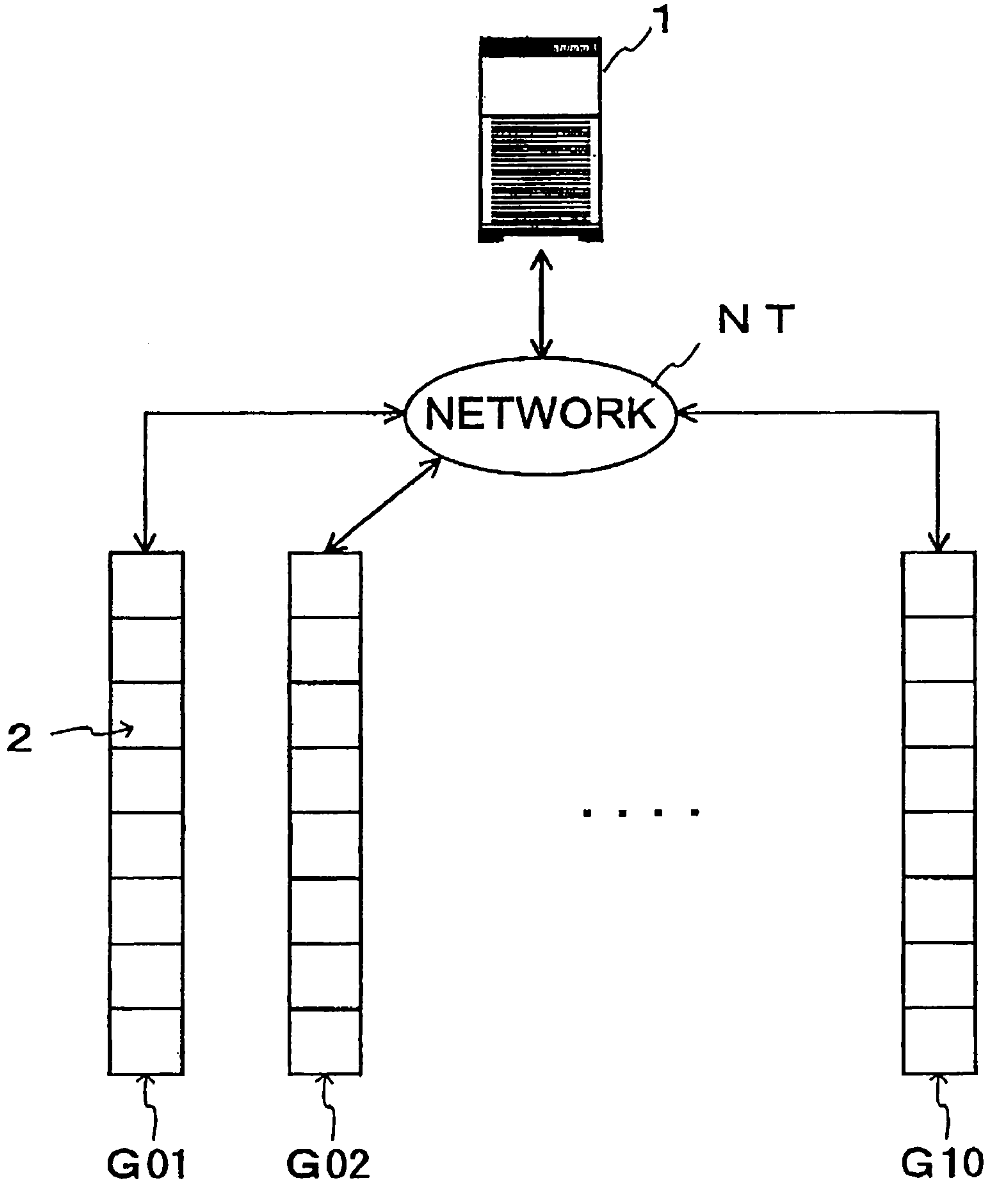
FIG. 1 is a diagram showing, in simplified form, the configuration of a credit return system according to the present invention.

FIG. 1 is a diagram showing, in simplified form, the configuration of a credit return system according to one preferred embodiment of the invention. Referring to FIG. 1, this credit return system comprises: (i) a game server 1; and (ii) a plurality of game machine groups G01, G02, . . . G10.

The game machine groups G01, G02, . . . G10 are respectively composed of a plurality of game machines 2. These game machine groups are respectively connected via a network NT to the game server 1, and can send to and receive from the game server 1 a variety of information via the network NT. Hereinafter, the whole of these game machine groups G01-01, G01-02, . . . , G01-10 is referred to as a "game center."

The game server 1 collectively controls the game machine groups G01, G02, . . . , G10, and discriminates the source of data sent from these game machine groups G01, g02, . . . , G10, based on the machine-group-numbers being individual to these game machine groups G01, G02, . . . , G10. On the other hand, when the game server 1 sends data to these game machine groups G01, G02, . . . , G10 and the game machines 2, the game server 1 designates the destination of the data by using the corresponding machine-group-number (identification number).

Data sent from and received by a game machine 2 contain: (i) the identification number being individual to this game machine; and (ii) identification information to identify the player currently playing with this game machine. Based on the identification information, the game server 1 judges whether a game is performed on the game machine 2.

Hereinafter, the game server is merely referred to as a "server."

[Mechanical Configuration of Game Machines]

Figure 2:
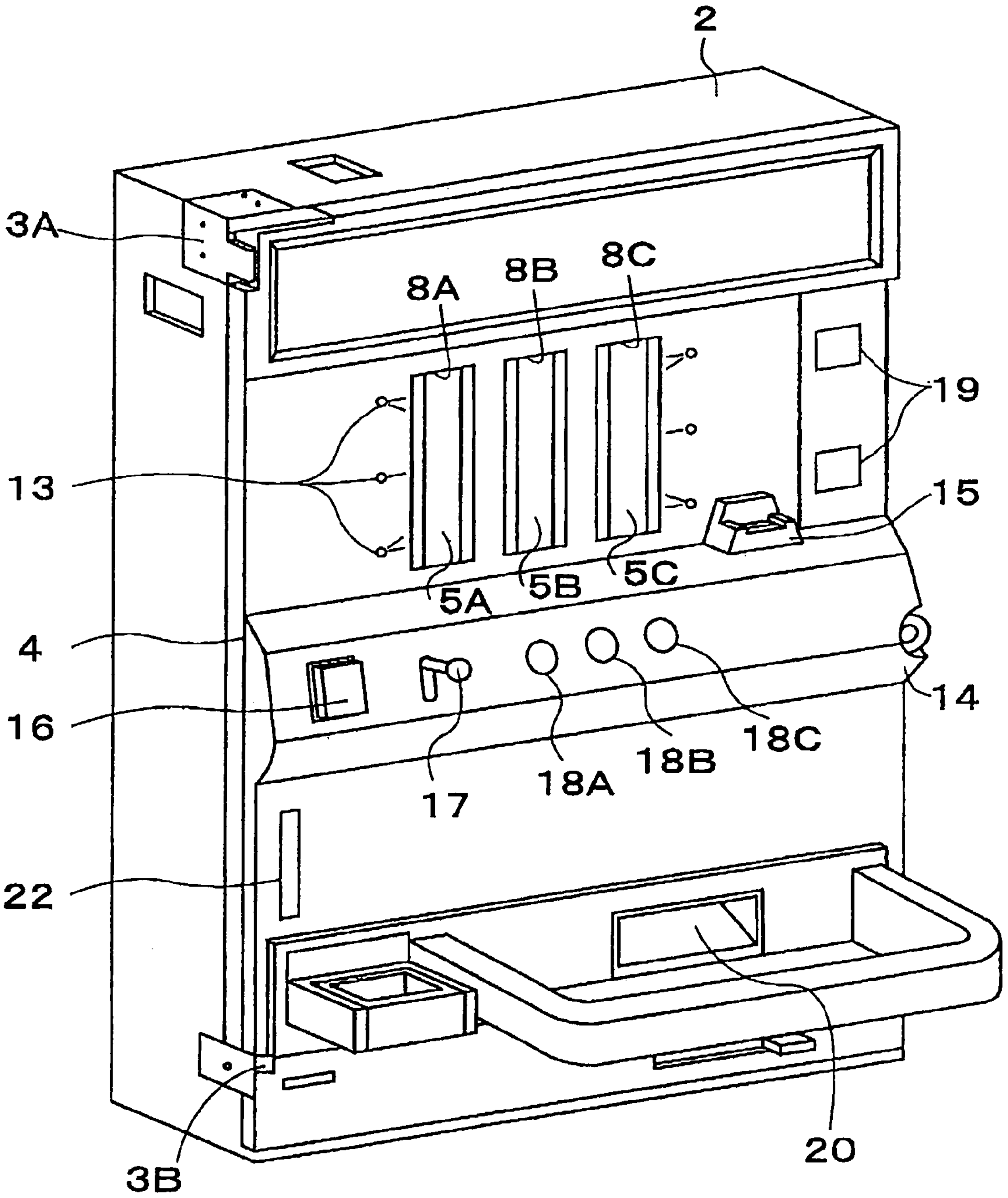
FIG. 2 is a perspective view showing the appearance of a game machine.
Figure 3:
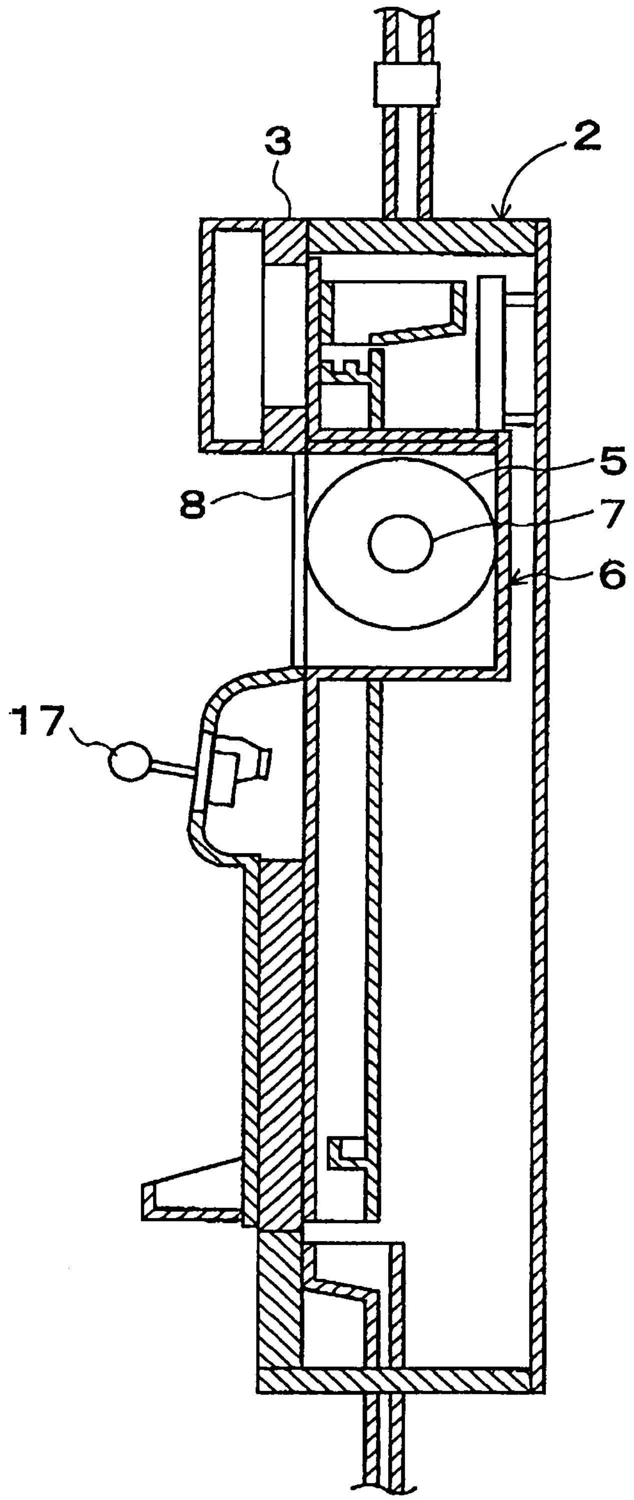
FIG. 3 is a vertical sectional view of the game machine.

FIG. 2 is a perspective view showing the appearance of a game machine. FIG. 3 is a vertical sectional view of the game machine. Referring to FIGS. 2 and 3, a game machine 2 is a slot game machine (slot machine) and has a frame body 3.

The frame body 3 is in the shape of hollow box and attached via hinges 3A and 3B to a front panel 4 such that it is able to open and shut to the front panel 4.

Attached to the rear surface of the front panel 4 is a casing 6, with which three rotating drums 5 (5A to 5C) arranged across the width thereof are covered from their back face.

The drums 5A to 5C are of tubular shape and are supported rotatively about rotary axes 7. Symbol marks (e.g., FIG. "7", bell, plum, cherry etc.) are respectively drawn on the peripheral surfaces of the drums 5A to 5C such that the symbol marks are aligned in a row around their periphery. Of the symbol marks drawn on the peripheral surfaces of the drums 5A to 5C, one symbol mark per drum is visible from the front side of the game machine 2 via windows 8A to 8C disposed on the front panel 4.

The rotary axes 7 of the drums 5A to 5C are attached rotatively via bearings (not shown) to a predetermined bracket (not shown) of the frame of the game machine 2. One ends of the rotary axes 7 are coupled to output axes of stepping motors 11A to 11C (see FIG. 4). Therefore, the drums 5A to 5C are rotatively driven by the stepping motors 11A to 11C, respectively, and controlled such that they are stopped at a predetermined rotational angle position by a control device 12 (see FIG. 4).

Projection parts (not shown) indicating a standard position are disposed on the peripheral end parts of the drums 5A to 5C. The control device 12 detects the rotational standard positions of the drums 5A to 5C when these projection parts cross the optical axes of optical sensors (not shown), which are disposed so as to correspond to the drums 5A to 5C. The rotational speed of the stepping motors 11A to 11C is set so as to make constant a speed at which symbol marks are displayed while changing.

Bet line indicator lamps 13 are disposed adjacent to the windows 8A to 8C. The lamps 13 are provided for indicating which line of plural symbol mark stop lines displayed on windows 8A to 8C has been selected as a bet object.

A control part 14 is located at the mid section of the front panel 4, and a bet button 16 is disposed in the control part 14. The bet button 16 is provided for setting a bet of medals entered via a throw-in slot 15. When the player pushes the bet button 16 by the amount of medals on which the player desires to bet, the corresponding bet line indicator lamp 13 is light up. The upper limit of bet medals is three in the game machine 2.

The bet lines are different depending on the number of times the bet button 16 is depressed. By one operation, a single line extending horizontally in the middle stage of the windows 8A to 8C is the object of bet line. By two operations, the object of bet line amounts to three lines obtained by adding two lines extending horizontally in the upper and lower stage of the windows 8A to 8C, to the above-mentioned line. By three operations, the object of bet line amounts to five lines obtained by adding two lines on the diagonal of the windows 8A to 8C, to the above-mentioned three lines. Four or more operations are invalid.

Upon setting a bet medal number according to the above-mentioned procedure, the control device 12 takes medals corresponding to the bet medal number set by the player. By taking the medals, the condition of starting slot game is established. In this state, when the player operates a start lever 17, the control device 12 rotates the drums 5A to 5C.

The control part 14 has three stop buttons 18A to 18C disposed at locations that correspond to the drums 5A to 5C, respectively. Upon depressing the stop buttons 18A to 18C, the corresponding drum is stopped.

The front panel 4 has digital indicators 19 for indicating, for example, the number of medals the player threw in for the game; and the number of medals to be discharged.

When one of predetermined specific combinations of symbol marks (winning state) in the drums 5A to 5C is aligned on the stop line on which the player bets, a medal payout device (not shown) is driven to discharge a predetermined number of medals to a medal payout tray 20.

Further, the front panel 4 has a card inlet 22, through which the player inserts a card storing an identification number data to identify the player when he/she plays a game with the game machine 2. A card reader 23 (see FIG. 4) reads the data of the inserted card.

[Electrical Control Configuration of Game Machine]

Figure 4:
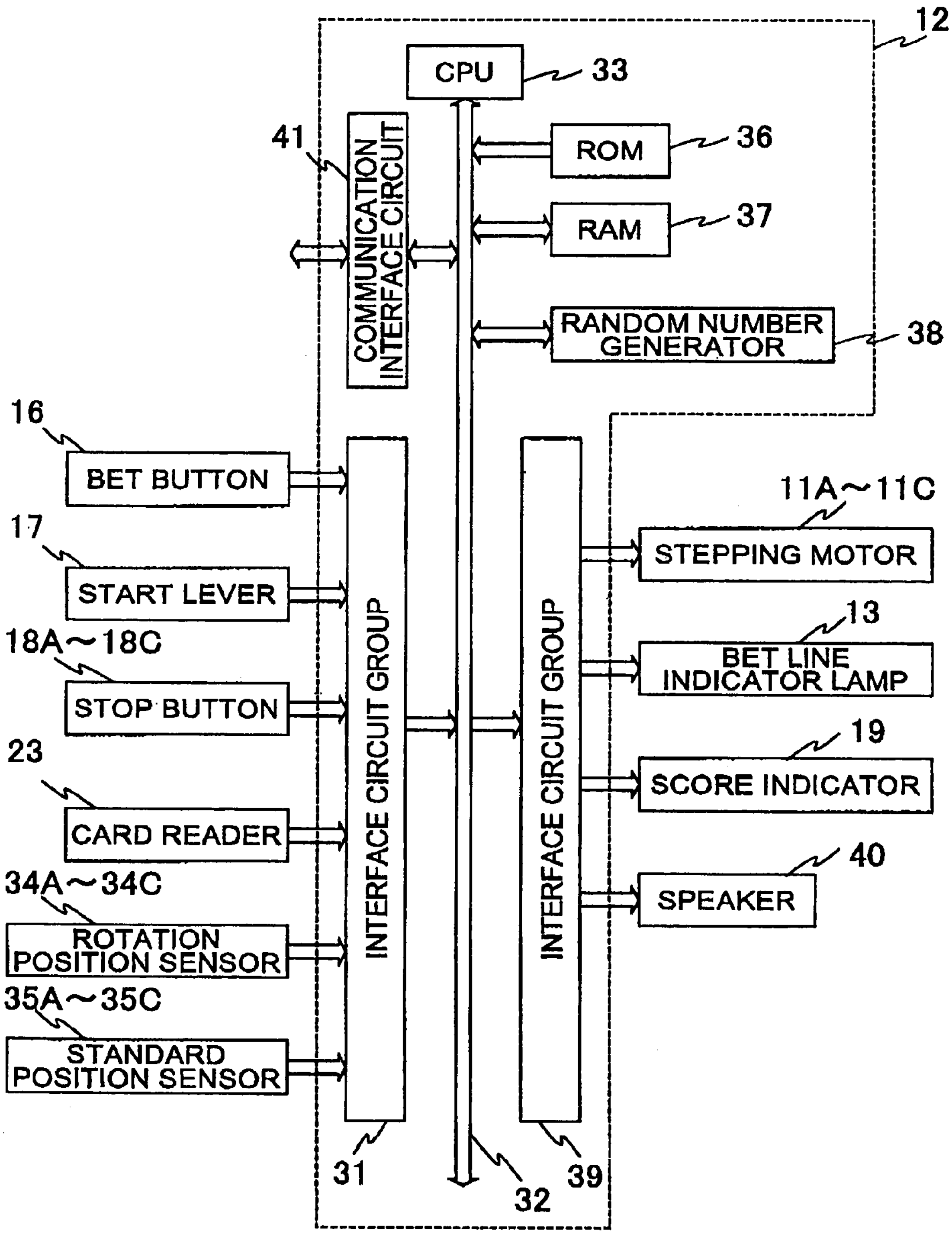
FIG. 4 is a block diagram showing the electrical configuration of the game machine.

FIG. 4 is a block diagram showing the electrical configuration of the game machine. Referring to FIG. 4, the control device 12 of the game machine 2 comprises: (i) first interface circuit group 31; (ii) input/output bus 32; (iii) CPU 33; (iv) ROM 36; (v) RAM 37; (vi) random number generator 38; (vii) second interface circuit group 39; and (viii) communication interface circuit 41.

The bet button 16 is connected to the first interface circuit group 31 being connected to the input/output bus 32. When the player depresses the bet button 16, an operation signal is issued from the bet button 16 to the interface circuit group 31. The interface circuit group 31 converts the operation signal to a predetermined voltage signal and provides it to the input/output bus 32. Therefore, before starting a game, a predetermined number of medals corresponding to a value indicated by the operation signal are thrown into the game machine 2 as the object of bet.

The input/output bus 32 performs input/output of data signals or address signals to the CPU 33.

The start lever 17 and stop buttons 18A to 18C arc connected to the first interface circuit group 31, on which (i) a start-up signal issued from the start lever 17; and (ii) a stop signal issued from the stop buttons 18A to 18C, are converted to predetermined voltage signals and then provided to the input/output bus 32.

When the start lever 17 is operated to start a game, the start-up signal is provided to the CPU 33. Upon receiving the start-up signal, the CPU 33 issues a control signal to the stepping motors 11A to 11C in order to rotate the drums 5A to 5C.

When the stop buttons 18A to 18C are depressed to stop the drums 5A to 5C, the respective stop signals from the stop buttons 18A to 18C are provided to the CPU 33. If desired to stop the first drum 5A, the player operates the stop button 18A. If desired to stop the second drum 5B, the player operates the stop button 18B. If desired to stop the third drum 5C, the player operates the stop button 18C. Upon receiving the stop signal, the CPU 33 issues the stop signal to the stepping motors 11A to 11C, in order to stop the drum corresponding to the operated stop button.

Rotational position sensors 34A to 34C are connected to the first interface circuit group 31. The sensors 34A to 34C are disposed in the vicinity of the stepping motors 11A to 11C, respectively. The sensors 34A to 34C issue angle position signals that respectively indicate the rotational angle positions of the stepping motors 11A to 11C, to the interface circuit group 31. For example, rotary encoders are usable as the rotational position sensors 34A to 34C.

Standard position sensors 35A to 35C are connected to the first interface circuit group 31. The sensors 35A to 35C are disposed in the vicinity of the drums 5A to 5C, respectively. The sensors 35A to 35C are optical sensors as described above, and issue standard position signals to the interface circuit group 31 when detecting the standard positions of the drums 5A to 5C.

The card reader 23, which is disposed within the game machine 2, is connected to the first interface circuit group 31. The card reader 23 issues a card status signal at a predetermined timing, in accordance with a signal sending demand from the CPU 33. When a card is inserted into the card inlet 22, for example, the signal level of the card status signal is higher than a standard level. Based on the change in signal level, the CPU 33 detects that the card is inserted. On the other hand, when no card is inserted (i.e., the state that the card has been drawn out from the card inlet 22), for example, the level of the card status signal returns to the standard level. Based on the change in signal level, the CPU 33 detects that no card is inserted.

The CPU 33 detects: (i) an angle position signal issued from the rotational position sensors 34A to 34C; and (ii) a standard position signal issued from the standard position sensors 35A to 35C. thereby obtaining data of symbol marks displayed on the windows 8A to 8C.

The ROM 36 and RAM 37 are connected to the input/output bus 32. The ROM 36 stores: (i) a program for controlling the game machine and returning medals; and (ii) an initial value of variable used in the program. Additionally, the ROM 36 stores data group indicating correspondence between a combination of symbol marks and random numbers. On the other hand, the RAM 37 stores flags and variable values.

The communication interface circuit 41 is connected to the input/output bus 32. The circuit 41 is used when performing sending/receiving of data between the game machine 2 and server 1.

The random number generator 38 for generating the above random numbers is connected to the input/output bus 32. When the CPU 33 issues an instruction for generating random numbers to the random number generator 38, the random number generator 38 generates random numbers in a predetermined range, and issues signals indicating the random numbers to the input/output bus 32. When a random number is issued from the random number generator 38, in order to determine a combination of symbol marks that corresponds to the random number, the CPU 33 searches the above data group and then substitutes a value corresponding to the combination for variables.

Usually either normal game or special game can be played with the game machine 2.

In the normal game, there are (i) an enabled prize-winning status that a combination of symbol marks stopped and displayed on an effective line can match a prize-winning pattern, and (ii) unabled prize-winning status that a combination of symbol marks cannot match a prize-winning pattern.

In the unabled prize-winning status, examples of symbol mark combinations that are changed on effective lines are: (i) failure pattern; and (ii) small prize pattern. The term "small prize" means that a predetermined number of symbol marks such as "cherry" and "bell" are aligned on one of the effective lines, and a few medals are discharged to the payout tray 20. On the other hand, the term "failure pattern" means that symbol marks are not aligned on any effective line, and no medals are discharged. The unabled prize-winning status can move to the enabled prize-wining status by an internal lottery processing. In the unabled prize-winning status, any prize-winning pattern cannot be aligned irrespective of a timing at which the stop buttons 18A to 18C are depressed. Hence, it is impossible to move from the normal game status to the special play status.

On the other hand, only in the enabled prizewinning status, a combination of symbol marks stopped and displayed by a timing at which the stop buttons 18A to 18C are depressed will match a prize-winning pattern. In other words, this state allows for "aiming (observation push)." When a combination of symbol marks stopped and displayed on an effective line matches a prize-winning pattern, the player wins a prize and the game style moves to the special game providing a chance of obtaining a large number of medals. On the other hand, when the player fails to obtain any prize-winning pattern by missing a timing of depressing the stop buttons 18A to 18C, the above-mentioned failure pattern or small prize pattern is aligned on the effective line. If once the enable prize-winning status is set, this status continues until a combination of symbol marks stopped and displayed matches a prize-winning pattern. There is no moving to the unable prize-winning status.

In the special game, there is extremely high probability that a combination of symbol marks stopped and displayed on an effective line will match a small prize pattern. This leads to a high possibility of obtaining a large number of medals. Upon finishing the special game, the game style moves to the normal game. When the normal game is performed after the special game, whether the game proceeds in the enabled prize-winning status or the unabled prize-winning status is to be determined by an internal lottery processing.

The second interface circuit group 39 is also connected to the input/output bus 32. To the circuit group 39, there are connected: (I stepping motors 11A to 11C; (ii) bet line indicator lamp 13; (iii) score indicator 19; and (iv) speaker 40. The circuit group 39 supplies a drive signal or drive power to each of these devices, For instance, when the player depresses the bet button 16, a drive current is applied to the bet line indicator lamp 13, in order to indicate a bet line that becomes effective in accordance with the number of throw-in medals. When the game is over, a drive signal is applied to the score indicator 19, in order to indicate the score corresponding to the prize-winning status. The speaker 40 makes an effective sound-corresponding to the game status when the game is started or over.

[Configuration of Game Server]

Figure 5:
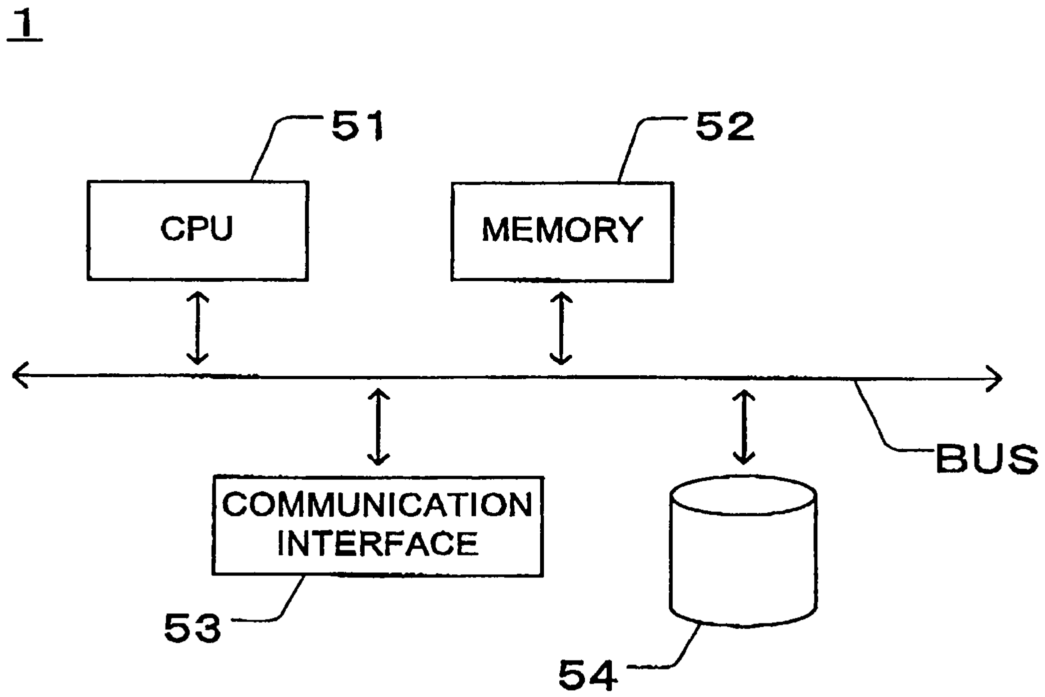
FIG. 5 is a block diagram showing the electrical configuration of a game server.

FIG. 5 is a block diagram showing the electrical configuration of the game server. Referring to FIG. 5, a server 1 has a data bus BUS. To the data bus BUS, there are connected (i) CPU 51; (ii) memory 52; (iii) communication interface 53; and (iv) database 54.

The CPU 51 executes various processing according to programs stored in the memory 52. Concretely, the CPU 51 receives data from the game machine 2 via a communication line connected by the communication interface 53, and stores the data in the memory 52. This data contains for example the upper limit data and return rate data of a plurality of game machines 2 under the control of the server 1, that is, information sent from the individual game machines 2 under the control of the server 1. The CPU 51 reads a program stored in the database 54 on the memory 52, and progresses the program based on the information sent from each game machine 2 that is stored in the memory 52. The progress of the program is stored in the database 54.

It is assumed in the following, for purposes of description, that the game machine 2 is activated in advance, and flags and variables are initialized to a predetermined value.

[Operation of Game Machine]

Figure 6:
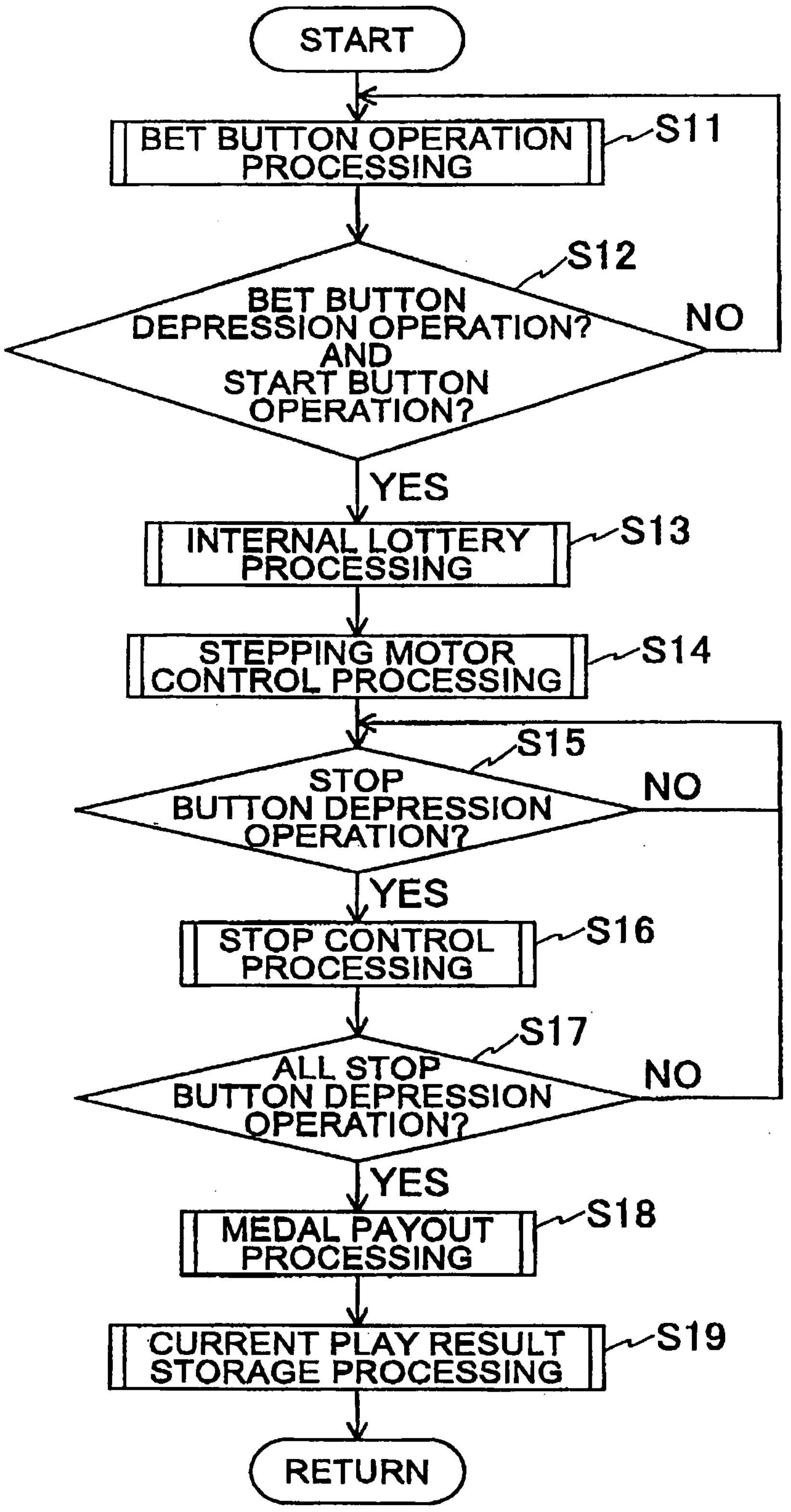
FIG. 6 is a flowchart showing the flow of control of the game machine.

FIG. 6 is a flowchart showing the flow of control of game machines. Referring to FIG. 6, firstly, the CPU 33 with the game machines 2 judges whether the bet button 16 is depressed by the player (step S11). The bet-button operating judgment processing is executed in accordance with the operation of depressing the bet button 16, and includes the following processing: (i) detecting whether an operation signal is issued from the bet button 16 in response to an operation to the bet button 16, thereby storing the number of throw-in medals with the operation; and (ii) issuing a drive signal to the bet line indicator lamp 13, in order to indicate the bet line that becomes effective in accordance with the number of throw-in medals.

Upon completing the above-mentioned bet-button operating judgment processing, the CPU 33 judges whether the pressing operation of the bet button 16 is performed and the operation of the start lever 17 is performed (step S12). When the CPU 33 judges both operations are performed, the CPU 33 moves the processing to step S13. On the other hand, when the CPU 33 judges both are not performed or none of these operations are performed, the CPU 33 returns the processing to step S11, and performs the bet-button operation processing again. A period of time that all the drums 5A to 5C arc started in rotation and are brought into a stop is a sequence of game (play).

Moving to the processing of step S13, the CPU 33 executes an internal lottery processing. The internal lottery processing includes processing of: (i) controlling the random number generator 38 to generate a random number, and (ii) searching data group indicating the correspondence between combinations of symbol marks and random numbers, thereby deciding a combination of symbol marks in accordance with the generated random number. The combination of symbol marks stopped and displayed on the previous game is stored in the RAM 37. In the following game, the CPU 33 reads the combination of symbol marks stored in the RAM 37, so that it is used for internal lottery processing.

In the internal lottery processing, a combination of symbol marks that can be stopped and displayed is determined by lottery, and a value indicating the lottery result is substituted for a lottery data of the currently performing game (current game lottery data). For instance, when it is in the unabled prize-winning status and in failure pattern, the current game lottery data is set to "00". When it is in the unabled prize-winning status and there occurs the symbol marks combination matching with a small prize pattern, the current game lottery data is set to "01". When it is in the enabled prize-winning status, the current game lottery data is set to "12". When it is in the special play status and in failure pattern, the current game lottery data is set to "20". When it is in the special play status and there occurs the symbol marks combination matching with a small prize pattern, the current game lottery data is set to "21". In an alternative, it may be checked whether the player has moved to an advantageous state based on the stopped symbol marks, without performing any internal lottery processing.

Upon completing the above-mentioned processing of step S13, the CPU 33 reads a subroutine about stepping motor control processing (not shown) and based on this subroutine, issues control signals to the stepping motors 11A to 11C, in order to drive each motor at a predetermined rotational speed (step S14). The term "rotational speed" means a speed at which the symbol marks are changeably displayed by the rotation of the drums 5A to 5C in the above-mentioned sequence of game (play), and means that any speed in the transient rotation state, such as of immediately after the drums 5A to 5C starts rotation and immediately before they are brought into a stop, are excluded from the concept of the rotational speed.

There is a lottery data of the game performed in the past that corresponds to the above-mentioned current game lottery data. The past game lottery data is data indicating the lottery result of the game performed before the current game, and the data is stored in the RAM 37. In the normal game to which the game style moves when the special game is over, the past game lottery data is reset at the time of performing the first game. The past game lottery data is updated by sequentially accumulating the current game result in the previous game result.

Upon completing the above-mentioned stepping motor control processing, the CPU 33 judges whether the player depressed any one of the stop buttons 18A to 18C in order to stop the drums 5A to 5C, and from which stop button a stop signal is issued (step S15). When the judgment result is that no stop signal is issued from the stop buttons 18A to 18C, the CPU 33 executes again the processing of step S15. On the other hand, when the judgment result is that a stop signal is issued from any one of the stop buttons 18A to 18C, the CPU 33 performs processing for stopping the stepping motors 11A to 11C (step S16). This stepping motor stop control processing includes: (i) controlling the random number generator 38 to generate a random number; and (ii) searching data group indicating the correspondence between combinations of symbol marks and random numbers, thereby deciding a combination of symbol marks in accordance with the generated random number.

The CPU 33 obtains symbol marks currently appearing on the windows 8A to 8C, based on (i) a rotational position signal issued from the rotational position sensors 34A to 34C; and (ii) a standard position signal issued from the standard position sensors 35A to 35C. The CPU 33 controls the stepping motors 11A to 11C and decides a stop position, based on (i) the above-mentioned symbol mark data, and (ii) the current game lottery data set in the above-mentioned internal lottery processing (step S13).

Although the CPU 33 stops the stepping motors 11A to 11C in accordance with the current game lottery data, if decided that any one of the stop buttons 18A to 18C is depressed, the CPU 33 can apply an additional drive to the stepping motors 11A to 11C, under prescribed conditions. Concretely, when any symbol mark corresponding to the current game lottery data cannot be stopped and displayed, the stepping motors 11A to 11C are subject to an additional drive in the range of the maximum amount of four symbol marks. In this connection, if any symbol mark corresponding to the current game lottery data is not present in that range, it is impossible to stop and display any symbol mark corresponding to the current game lottery data. For instance, even when in the enabled prize-winning status, two drums are already stopped and there is a symbol mark(s) allowing for match with a winning pattern, whether the player obtains the winning pattern depends on the timing at which the player operates the stop button corresponding to the last drum to be stopped. On the other hand, when in the unabled prize-winning status, two drums are already stopped and there is a symbol mark(s) allowing for a winning pattern, the stepping motors 11A to 11C are controlled so as not to provide a match with the winning pattern, irrespective of the timing of operation of the stop button corresponding to the last drum to be stopped.

Upon completing the above-mentioned stepping motor stop control processing, the CPU 33 judges whether all the stop buttons 18A to 18C are depressed (step S17). In other words, in the judgment processing of step S17, it is judged whether there are detected all the stop signals issued in accordance with the depressing operation to the stop buttons 18A to 18C. In this connection, when the judgment result is that all of the stop buttons 18A to 18C are not operated, the CPU 33 returns the processing to step S15. On the other hand, when the judgment result is that all the stop buttons 18A to 18C are operated, the CPU 33 moves the processing to step S18.

Moving to the processing of step S18, the CPU 33 judges whether a combination of symbol marks aligned on the line that becomes effective matches with a winning status, and pays out game medals corresponding to the winning status. In this medal payout processing, when the judgment result is that (i) the combination of symbol marks aligned in the effective line and (ii) the wining state are each matched, the CPU 33 calculates the number of payout medals corresponding to the winning status, and pays out the number of medals corresponding to the calculated number. Thereafter, the CPU 33 moves the processing to step S19. On the other hand, when the judgment result is that the combination of symbol marks aligned in the effective line and the winning state are not matched, the CPU 33 moves the processing to step S19, without executing any medal payout.

Moving to the processing of step S19, the CPU 33 mainly stores the current game lottery data (step S19). In this preferred embodiment, the CPU 33 terminates the processing of storing the current game result when a past game lottery data is read from the RAM 37 and stored the current game lottery data together with the read past game lottery data in the RAM 37. At this time, for example, data indicating the actually stopped and displayed symbol marks in the present game is also stored in addition to the present game lottery data.

[Flow of Operation of Game Machine]

Figure 7:
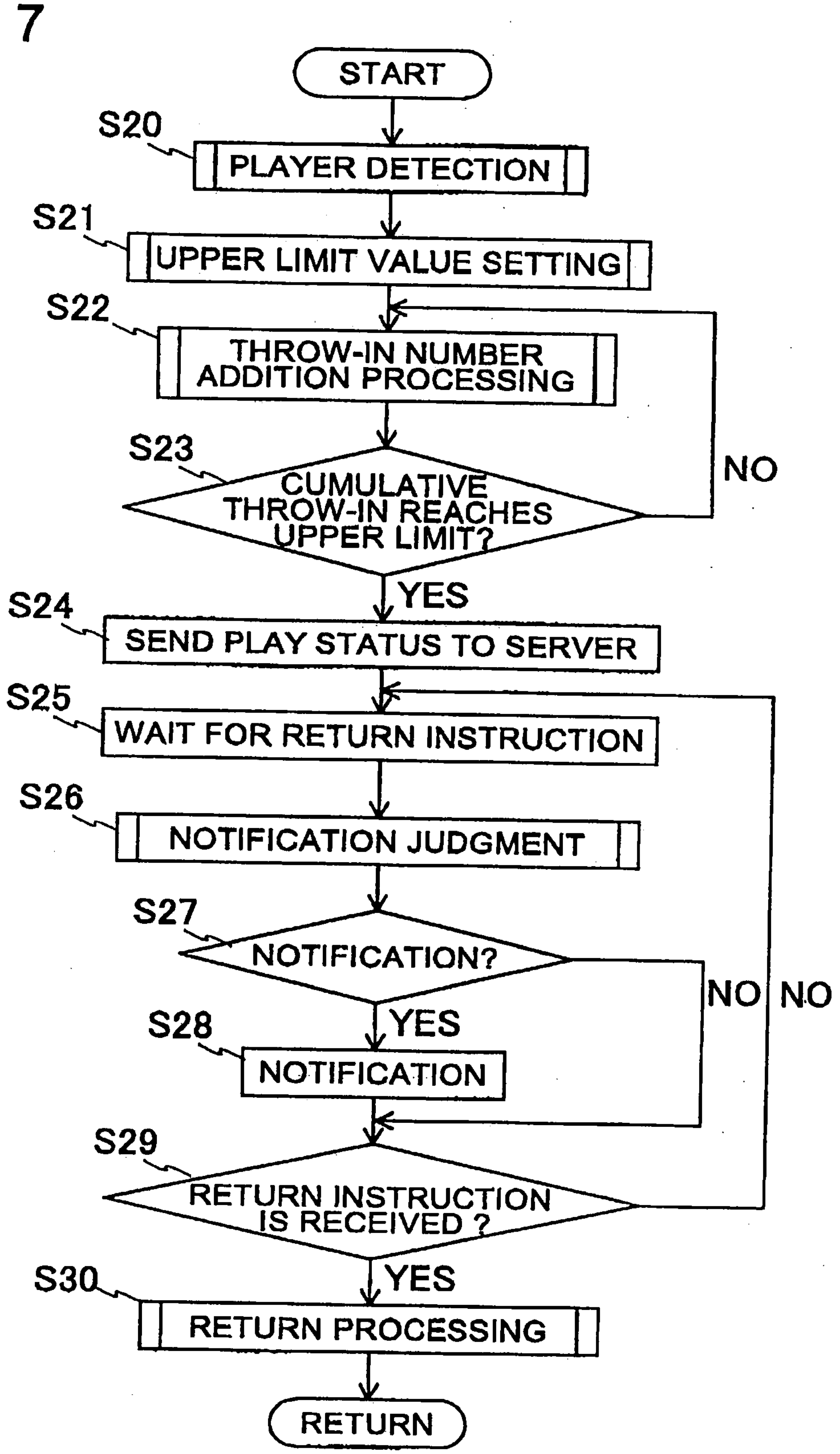
FIG. 7 is a flowchart showing the flow of operation of the game machine.

FIG. 7 is a flowchart showing the flow of operation of game machines. The procedure shown in this flowchart is performed concurrently with the subroutine of the game machines 2 shown in FIG. 6.

Referring to FIG. 7, the game machine 2 detects and identifies or discriminates the player (step S20). This player identification (discrimination) processing is to be performed by the CPU 33 with the game machine 2, in order to judge whether a game is being performed on the game machine 2.

The reason why the player discrimination processing is particularly necessary is that a return is executed per game machine group (when the cumulative credit consumption of a game machine group reaches an upper limit, a return is executed to a certain game machine in the game machine group) in this preferred embodiment, unlike the conventional game machine executing a return per game machine. That is, to avoid the case that the return is executed to the game machine where nobody performs a game, it is necessary to check whether a game is performed on the individual game machines. Following is a method of judging whether the game machine is in the play status.

Play status judgment is processing for judging whether there is a player performing a game on a game machine 2 (i.e., whether the game machine 2 is in play). When the game machine 2 is not in play status, the following processing is unnecessary. It is therefore necessary to firstly check whether the game machine 2 is in play. The play status judgment is performed by detecting whether a card is inserted into the card inlet 22 provided on the front panel 4 of the game machine 2.

This card detection is achieved by detecting whether a card is inserted into the card inlet 22 with the card reader 23. The card to be inserted is an identification card storing information to identify the player, which can have any function other than identification. For example, a card (e.g., a prepaid card) storing information to identify the player can be used.

When the result of the card detection is that no card is inserted, the CPU 33 terminates the player discrimination processing. At this time, the CPU 33 sends the server 1 a signal of discrimination result that no card is detected. As the contents of signals related to the card detection, for example, data “0” is sent when no card is detected, and data “1” is sent when a card is detected. This way, the server 1 controls a game machine on which no card is detected, thereby avoiding that the return is executed to the game machine on which no player is present.

The results of judgment whether the game machines 2 of the game machine groups G01, G02, . . . , G10 are in play or not, are stored in the database 54 with the server 1. This storage is updated properly and used in a lottery for selecting a game machine to which a return is executed.

Although in this preferred embodiment, an identification card storing data to verify the player or an ID card is used as means for discriminating the player, the following means are applicable. For example, a human sensor to detect human body may be attached to the game machine 2. Alternatively, a stool on which the player sits for performing a game may have the function of weighing such that the player's body weight is weighed and stored in order to identify the player.

Upon completing the above-mentioned sequence of player discrimination processing, the CPU 33 with the game machine 2 sets an upper limit value that is a standard for return (step S21). The upper limit value is the number of medals, as a game medium, which is used for performing a game on a slot game machine etc. When in a certain game machine group, the total number of medals used by the game machines of the game machine group reaches the upper limit value, the return is executed to a certain game machine of the game machine group.

For setting such upper limit value, preset upper limit values being individual to the game machine groups (G01, G02, . . . , and G10) are used. These preset upper limit values are stored in the RAM 37 with the game machines 2 of the game machines groups (G01, G02, . . . , and G10). The CPU 33 reads the upper limit value data from the RAM 37 and then terminates the upper limit value setting.

Upon completing the above-mentioned upper limit value setting processing, based on the judgment processing result in step S11 shown in FIG. 6, the CPU 33 adds the number of medals that the players threw in as a game medium (step S22). The processing for adding the medal throw-in number is to calculate the accumulating total of medals that the players threw in the game machines to perform a game. A medal sensor (not shown) provided within the game machine 2 counts medals thrown in through the throw-in slot 15. The counted number data is added to a cumulative throw-in number data, which is data of medals thrown in the past, and stored as a current throw-in medal data. Hereinafter, the cumulative consumption of credit is referred to as a "cumulative throw-in number of medals."

The above-mentioned cumulative throw-in number data is stored in the RAM 37. The CPU 33 executes the following processes of: (i) reading data of the past throw-in medal from RAM 37; (ii) adding data of the current throw-in medal counted by the medal sensor to data of the cumulative throw-in number; and (iii) storing the result of addition as updated cumulative throw-in number data in the RAM 37. At a predetermined timing, this cumulative throw-in number data is sent from each game machine 2 to the server 1 via the communication interface circuit 41, network NT, and communication interface 53 with the server 1. The cumulative consumption data sent from the individual game machines 2 are controlled by the corresponding game machine groups (G01, G02, . . . , and G10), and used for judging whether the cumulative credit consumption of the game machine groups (G01, G02, . . . , and G10) reaches a predetermined upper limit.

Upon completing the above-mentioned throw-in medal number addition processing, the CPU 33 judges whether the cumulative throw-in number reaches the upper limit (step S23). The game machines 2 receive the result of judgment made by the server 1. The server 1 judges by comparing (i) the cumulative throw-in number data sent from the individual game machines 2 at a predetermined timing in the processing of step S22; and (ii) the upper limit value set in the processing of step S21 (this value is also stored in the database 54 with the server 1). The judgment result obtained by the server 1 is sent to all the game machines 2 of the corresponding game machine groups G01, G02, . . . , G10. The server 1 sends the game machines 2 via the communication interface 53, network NT, and communication interface circuit 41, a numerical data of "1" when it reaches the upper limit, and a numerical data of "0" when it does not reach the upper limit.

When the judgment result is that the cumulative throw-in number data does not reach the upper limit, the CPU 33 returns the processing to step S22, and continues processing for adding the number of medals that the players throw in the game machines 2.

On the other hand, when the judgment result is that the cumulative throw-in number reaches the upper limit, the CPU 33 sends a play status to the server 1 (step S24). In the processing for sending the play status to the server 1, a game machine 2, which has received from the server 1 a signal indicating that the cumulative throw-in number data reached the upper limit in the above-mentioned processing of step S23, sends the server 1 a signal indicating that a game is being performed on the game machine 2.

By this processing for sending a signal indicating the play status, the server 1 can confirm which game machines 2 are in play among the game machine group G01, G02, . . . , or G10, to which the server 1 executes the return. For example, if an identification number of "123" is assigned to the game machine 2 that has received a signal indicating the arrival at the upper limit, among the plurality of game machines under control of the server 1, a signal of "123-1" (here the numerical value of "1" that is a signal indicating the play status is hyphenated with the identification number of "123" of the game machine 2) is sent to the sever 1.

Upon completing the above-mentioned processing for sending a signal indicating the play status to the server 1, the CPU 33 waits for a return instruction (step S25). The return instruction is a signal to be sent from the server 1 to a game machine 2 that the server 1 has selected as a return destination from the game machines 2 contained in the game machine group (G01, G02, . . . or G10), the cumulative throw-in number data of which reaches the upper limit. The game machine 2 allows the player to perform a game even when waiting for the return instruction.

A signal indicating the execution of a return is sent from the server 1 to the game machine 2 as the return destination, via the communication interface 53 with the server 1, network NT, and communication interface circuit 41 with the game machine 2. Concretely, this signal is obtained by affixing the numerical value of "1" indicating the execution of the return, to the machine-number as the return destination.

In the above-mentioned return instruction waiting status, the CPU 33 judges whether notification should be executed or not (step S26). The notification is to notify that the return will be executed from now to the game machine 2 installed in the game center. The notification judgment processing is to judge whether notification should be executed before or after the return is executed.

By referring to the data stored in the RAM 37, the CPU 33 determines when notification should be executed (step S27). The RAM 37 stores data about the timing of notification. Data of "1" is assigned when performing notification before the return is executed. On the other hand, data of "0" is assigned when performing notification after the return is executed. These data may be preset to the game machine 2. Alternatively, the server 1 may determine by lottery every time and send the content thus determined to the game machine 2.

When the data stored in the RAM 37 is "1", the CPU 33 notifies the player the content that the return will be executed to the game machine 2 on which the player is performing a game (step S28). This notification may be executed by using an illuminator provided within the game machine 2. Alternatively, the game machines 2 may have a display part performing notification to the player. Further, any notification means for letting the player know if his game machine receives the return may be employed, whether it be provided integrally with the game machines 2.

When the above-mentioned notification processing is completed, or when it is set that notification is performed after the return is executed, the CPU 33 judges whether the return instruction is received (step S29). This return instruction is one that the game machine 2 waits for its arrival from the server 1 in the processing of step S25. At a predetermined timing, the server 1 sends a signal that is the return instruction to the game machine 2 via the communication interface 53. In the game machine 2, the CPU 33 receives the return instruction via the communication interface circuit 41 and input/output bus 32. If the return instruction is not received, the CPU 33 returns the processing to step S25, and waits for the return instruction again.

As the above-mentioned signal that the server 1 sends, the numerical data of "1" is sent to the game machine that has been selected by lottery, as the return destination. On the other hand, the numerical data of "0" is sent to other game machines that have not been selected as the return destination.

Upon completing the above-mentioned return instruction receiving processing, the CPU 33 executes return processing (step S30). This return processing is executed based on the return instruction issued from the server 1 in the above-mentioned processing of step S29. When the signal content is the numerical data of "1" that indicates the execution of a return, the CPU 33 receives from the server 1 data indicating to what extent the return should be executed to the game machine 2, and executes the return based on this data. The number of medals to be returned can be calculated by multiplying (i) the upper limit value of the corresponding game machine group G01, G02, . . . , or G10, which is stored in the RAM 37, by (ii) a predetermined return rate. On the other hand, when the signal content is the numerical data of "0" that indicates no return execution, the CPU 33 terminates the processing without executing any return in step S30.

Upon completing the above-mentioned return processing, the CPU 33 moves again the processing to the upper-limit value setting processing (step S21), and repeats the above-mentioned sequence of processes.

[Operation of Game Server]

Figure 8:
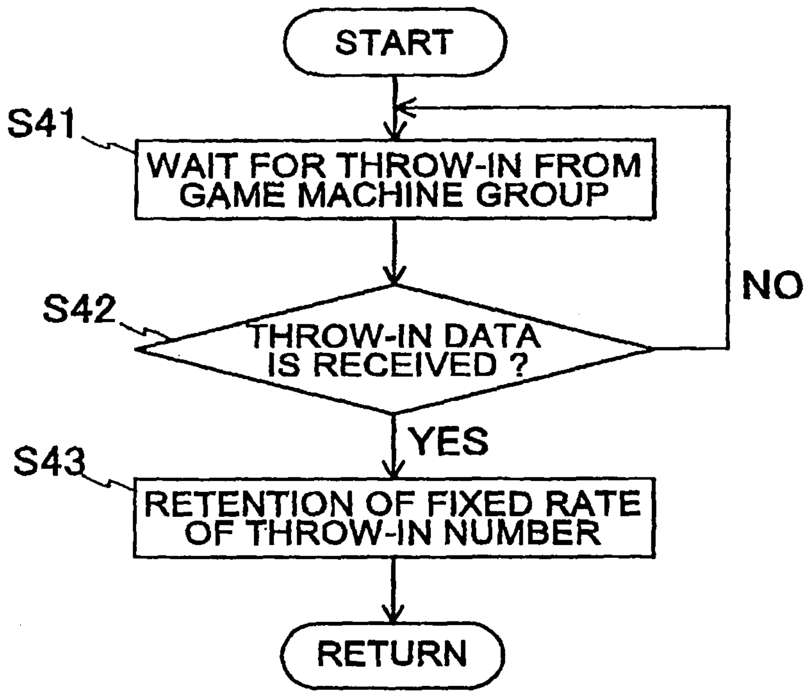
FIG. 8 is a flowchart showing the flow of operation when the game server makes preparation for return.

FIG. 8 is a flowchart showing the flow of operation when the game server 1 makes preparation for return. This operation is always repeated in the server 1.

The server 1 always holds some of medals that have been thrown as a game medium in the individual game machines 2 in the game machine groups (G01, G02, . . . , and G10) under control of the server 1, in preparation for the execution of a return when the game machine group (G01, G02, . . . , or G10) reaches the upper limit.

Referring to FIG. 8, the server 1 waits for the game medium throw-in result from the game machine groups (G01, G02, . . . , and G10) (step S41). As the game medium that the player uses on each game machine 2, it is possible to use any tangible matters, e.g., medals, winning balls, or coins, each being used generally. Besides these, any intangible matters that can be expressed in numerical value as data are also handled as a game medium in this preferred embodiment. The term "throw-in" means the following action that a player makes a game machine recognize the game medium for the purpose of playing a game, irrespective of the type of the game medium. Therefore, not only a medal etc. that is thrown in through the throw-in slot 15 and detected by the medal sensor of the game machine 2, but also numerical value data etc. that the player decides to use for the game may be a subject matter that the server 1 wait for.

The data of the number of game media thrown in the game machine 2 are, as described above, sent from the individual game machines 2 to the server 1. The server 1 controls the received data in units of the game machine groups (G01, G02, . . . , and G10).

In the status that the server 1 is waiting for throw-in of a game medium, the CPU 51 with the server 1 judges whether game medium throw-in data have been received at a predetermined timing (step S42). In this preferred embodiment, medals are used as the game medium, and the player continues a game on the game machine 2, while throwing in medals via the throw-in slot 15. The number of these medals is detected by the medal sensor with the game machine 2, and made into a numerical value as data. This numerical value data is stored as cumulative throw-in number data in the RAM 37 with the game machine 2. At a predetermined timing, this cumulative throw-in number data is sent to the server 1 via the communication interface circuit 41. On the other hand, the server 1 receives this cumulative throw-in number data via the communication interface 53. Based on an instruction of the CPU 51, the received cumulative throw-in number data are properly stored (held) in the memory 52, in units of the game machine groups G01, G02, . . . , G10. When the judgment result of step 42 is that the server 1 has received no throw-in data, the CPU 51 returns the processing to step S41.

Upon completing the throw-in data receiving judgment processing, the CPU 51 holds a predetermined rate of the throw-in number (step S43). As stated above, the server 1 is constructed so as to hold in advance the game medium for the return to the player performing a game on the individual game machine 2 under control of the server 1. The game machine groups (G01, G02, . . . , and G10) have different hold amounts. The hold amount is determined by multiplying the cumulative throw-in number data of the corresponding game machine group (G01, G02, . . . , or G10), which the server 1 received in step S42, by a predetermined rate (return rate).

In this hold processing, the server 1 sends via the communication interface 53 a numerical value data corresponding to the hold amount calculated by the CPU 51 to the game machines 2 contained in the corresponding game machine group (G01, G02, . . . , or G10).

Upon completing the above-mentioned hold processing, the CPU 51 with the server 1 returns to the state of waiting for throw-in data from the game machine groups (G01, G02, . . . , and G10) (step S41), and repeats the foregoing sequence of processes.

Figure 9:
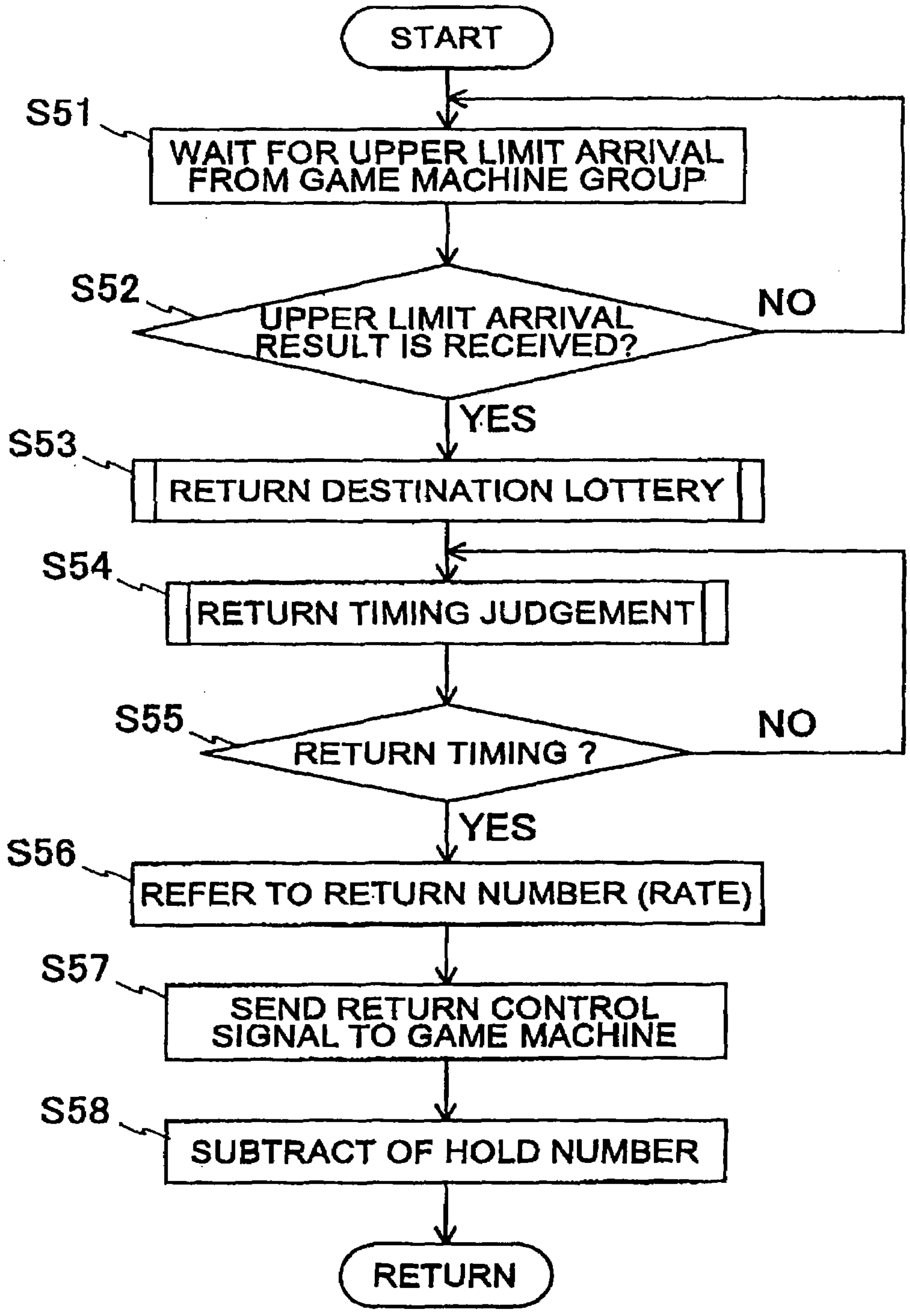
FIG. 9 is a flowchart showing the flow of operation when the game server executes a return.

FIG. 9 is a flowchart showing the flow of operation when the game server executes the return. This operation is always repeated.

Referring to FIG. 9, firstly, the CPU 51 with the server 1 waits for an upper limit arrival result from the game machine groups (G01, G02, . . . , and G10) (step S51). This upper limit arrival result indicates that the total game media thrown in each game machine 2 of the corresponding game machine group (G01, G02, . . . , or G10), reaches a preset amount, as described above. Judgment whether it reaches the upper limit is made on the server 1. When the judgment result is the arrival of the upper limit, the result is sent from the server 1 to the individual game machines 2 of the corresponding game machine group G01, G02, . . . , or G10. Upon receiving this result, the individual game machines 2 send a signal indicating recognition of the upper limit arrival. The server 1 waits for this upper limit arrival signal via the communication interface 53.

When the server 1 is waiting for the upper limit arrival result, at a predetermined timing, the server 1 judges whether the upper limit arrival result has been received (step S52). The CPU 51 executes this judgment. When the judgment result is that the upper limit arrival result has been received, the CPU 51 moves the processing to the step S53. On the other hand, the judgment result is that any upper limit arrival result has not been received, the CPU 51 returns to the upper limit arrival result wait processing (step S51), and repeats judgment whether the upper limit arrival result has been received, at the predetermined timing.

Moving to the processing of step S53, the CPU 51 selects a return destination by lottery. As an example of the lottery for selecting a return destination, there is such a style that "a return will be executed to a game machine of which machine-number meets a lottery number, among the game machines that form the corresponding game machine group and are in play." By referring to the machine-numbers of the game machines 2 that have sent the signal indicating the recognition of the upper limit arrival, the CPU 51 performs a lottery for selecting one from these machine-numbers. This lottery result is then stored in the memory 52, based on an instruction of the CPU 51.

Upon completing the above-mentioned return-destination lottery processing, the CPU 51 judges a return timing (step S54). The return timing can be set variously. For example, to the game machine that has reached the upper limit and been selected as the return destination, the return is forced to execute immediately after all the processes on the server 1 are terminated. Alternatively, the return is executed after an elapse of a predetermined period of time from the termination of all the processes on the server 1, or after performing a predetermined number of games.

This processing for judging a return timing is to judge at which timing the return should be executed. If the return timing is predetermined uniquely, the return timing is employed.

Upon completing the above-mentioned return timing judgment processing, the CPU 51 judges whether the return timing is established (step S55). The term "return timing" is one that has been determined in the processing of step S54, and this return timing is stored in the memory 52 with the server 1. For instance, if given a temporal timing such as "after a predetermined number of minutes from the upper limit arrival," a timer (not shown) within the server 1 is used to control this timing. If given a timing based on the player's game circumstances such as "when the player performs twenty games after the upper limit arrival," various sensors within the game machine 2 are used to judge whether predetermined conditions are satisfied. At the time the conditions are satisfied, a signal indicating this content is sent from the CPU 33 with the game machine 2 to the server 1.

When the judgment result is that no return timing is established, the CPU 51 returns the processing to step S54, and repeats the processing from step S54.

On the other hand, when the judgment result is that the return timing is established, the CPU 51 refers to a return number (step S56). When the cumulative credit consumption of the game machine group (G01, G02, . . . , or G10) reaches a predetermined upper limit, a return is executed based on the result obtained by multiplying the upper limit value by a preset return rate on the server 1 side. At this time, the CPU 51 refers to a game table, indicating the relationship between return rates and data of the upper limits of game machine groups as a return destination.

FIG. 10 shows an example of the game table stored in the database 54 with the server 1. Referring to FIG. 10, the contents registered on this table are (i) the group-number of a plurality of game machine groups (G01, G02, . . . , and G10: game-machine-group-numbers) installed in a game center under control of the server 1; (ii) the payout upper limits and return rates being individual to the game machine groups (G01, G02, . . . , and G10); and (iii) data indicating whether they reach a predetermined upper limit. The CPU 51 refers to the value "return rate" on this game table in order to calculate the credit number to be used for executing a return.

Referring again to FIG. 9, upon completing the above-mentioned return number reference processing, the CPU 51 sends a return control signal to the game machine 2 as a return destination (step S57).

The return control signal, which is sent from the server 1 to each game machine 2 included in any of the game machine groups: G01, G02, . . . , and G10 where the server 1 executes the return, gives the value of "1", which indicates that the game machine 2 is the return destination, to some game machine 2 being determined as the return destination in step S51. While it gives the value of "0", which indicates that the game machine 2 is not the return destination, to other game machine 2 being determined as the not return destination in step S51.

This return control signal contains data indicating the degree (amount) of the return. The data contained in the return control signal are sent via the communication interface 53, based on an instruction of the CPU 51.

Upon completing the above-mentioned processing for sending the return control signal, the CPU 51 subtracts a hold number (step S58). The term "hold number" means the game medium number that was held in the memory 52 with the server 1 in the processing of step S43 shown in FIG. 8. This hold game medium is used for the return to each game machine 2. It is therefore necessary to perform subtract processing of the game medium number data corresponding to the return amount.

By this hold number subtraction processing, the hold number data is updated and stored in the memory 52.

In the case of changing the return amount to a game machine 2 depending on the play status, there may be configured such that when the return to the game machine 2 is completed, the CPU 33 with the game machine 2 sends the server 1 data indicating the return amount to the player and subtraction processing is started after receiving this data.

Upon completing the above-mentioned hold number subtraction processing, the CPU 51 returns the processing to step S51, and resumes the processing for waiting for upper-limit arrival result and later processing.

[Operations and Effects]

This preferred embodiment produces mainly the following operations and effects.

In a game center installing a plurality of game machine groups as a collection of game machines, a game server collectively controls the cumulative credit consumption of the individual game machine groups. At this time, when the cumulative credit consumption of a certain game machine group reaches a predetermined upper limit, a return is executed to a certain game machine of this game machine group. As a result, unevenness of the probability of a prize, which has been the problem of the conventional game machines, can be solved in the form of "return." Further, it is possible to provide a game machine of higher game characteristics by the presence of such gambling characteristics that it remains to be seen which game machine will receive a return. It is also possible to solve the problem of extremely low probability of release, as in the conventional jackpot, by controlling the return per game machine group. The effect of these is that the entire game center becomes lively and the problem of customer missing can be eliminated.

While but one embodiment of the invention has been shown and described, it will be understood that many changes and modifications may be made therein without departing from the spirit or scope of the present invention.

What is claimed is:

1. A game server for collectively controlling a plurality of game machine groups installed in a game center, said plurality of game machine groups including a first game machine group and a second game machine group respectively including a plurality of game machines, each of which is brought into a status enabling to start a game based on a thrown coin or a given credit number and is given a payout according to a result of said game, said game server including:

a memory configured to individually store cumulative credit consumptions of each of said plurality of game machine groups, wherein said memory has a plurality of units for each of said game machine groups respectively storing a cumulative credit consumption of each of said game machine groups;

judge means for judging whether a cumulative credit consumption of a predetermined game machine group reaches a predetermined upper limit, based on information stored in said memory, and for executing a return at a time point depending on a game condition of one game machine of said predetermined game machine group, after a completion of a lottery to select the one game machine where the return is to be executed; and first sending means for sending, when said judge means judges that said cumulative credit consumption of said predetermined game machine group reaches the predetermined upper limit, a return signal for executing said return based on a predetermined return rate, to the one game machine of said predetermined game machine group, said return being executed regardless of a game result, wherein at least one of the predetermined upper limit and the predetermined return rate is individually set for each of said plurality of game machine groups and wherein the game machines in the first game machine group are different from the game machines in the second game machine group.

2. The game server according to claim I, further including:

lottery means for determining by the lottery the game machine to which said return is executed.

3. The game server according to claim 2, further including:

second sending means for sending a notification signal to notify the one game machine of said predetermined game machine group that said return will be executed or that said return was executed.

4. The game server according to claim 1, further including:

second sending means for sending a notification signal to notify the one game machine of said predetermined game machine group that said return will be executed or that said return was executed.

5. The game server according to claim 1, wherein the return is executed to the one game machine, which has been selected by the lottery in said predetermined game machine group, after confirming that the one game machine is in play.

6. A game machine that is controlled by a game server for collectively controlling a plurality of game machine groups including a first game machine group and a second game machine group and installed in a game center, the game machine included in a game machine group of said plurality of game machine groups, said game server judging whether cumulative credit consumptions of said game machine groups reach predetermined upper limits, based on information stored in a memory configured to individually store cumulative credit consumptions of each of said plurality of game machine groups, wherein said memory has a plurality of units for each of said game machine groups respectively storing a cumulative credit consumption of each of said game machine groups, the game machine brought into a status enabling to start a game based on a thrown coin or a given credit number and is given a payout according to a result of said game, said game machine including:

a first receiving means for receiving a return signal sent from said game server, said first receiving means receiving the return signal, when said game server judges that said cumulative credit consumption of said game machine group reaches the predetermined upper limit, the return signal executing a return based on a predetermined return rate, said return being executed regardless of a game result, and when said game server executes a return at a time point depending on a game condition of the game machine, after a completion of a lottery to select the game machine where said return is to be executed and a display configured to display symbol combinations as a result of said game, wherein at least one of the predetermined upper limit and the predetermined return rate is individually set for each of said plurality of game machine groups and wherein game machines in the first game machine group are different from game machines in the second game machine group.

7. The game machine according to claim 6, further including:

return means for executing said return based on a result of the lottery performed by said game server.

8. The game machine according to claim 7, further including:

second receiving means for receiving a notification signal sent from said game server.

9. The game machine according to claim 6, further including:

second receiving means for receiving a notification signal sent from said game server.

10. The game machine according to claim 6, wherein the return is executed to the game machine, which has been selected by the lottery in said game machine group, after confirming that the game machine is in play.

11. A method for collectively controlling a plurality of game machine groups installed in a game center, said plurality of game machine groups including a first game machine group and a second game machine group respectively including a plurality of game machines each of which is brought into a status enabling to start a game based on a thrown coin or a given credit number and is given a payout according to a result of said game, and said game center comprising a memory configured to individually store cumulative credit consumptions of each of said plurality of game machine groups, wherein said memory has a plurality of units for each of said game machine groups respectively storing a cumulative credit consumption of each of said game machine groups, said method including:

judging whether a cumulative credit consumption of a predetermined game machine group reaches a predetermined upper limit, based on information stored in said memory;

executing a return at a time point depending on a game condition of one game machine of said predetermined game machine group, after a completion of a lottery to select the one game machine where said return is to be executed and sending, when a result of said judging is that said cumulative credit consumption of said predetermined game machine group reaches the predetermined upper limit, a return signal for executing said return based on a predetermined return rate, to the one game machine of said predetermined game machine group, said return being executed regardless of a game result, wherein at least one of the predetermined upper limit and the predetermined return rate is individually set for each of said plurality of game machine groups and wherein the game machines in the first game machine group are different from the game machines in the second game machine group.

12. The method according to claim 11, further including:

determining by the lottery the game machine to which said return is executed.

13. The method according to claim 12, further including:

sending a notification signal to notify the determined game machine of said predetermined game machine group that said return will be executed or that said return was executed.

14. The method according to claim 11, further including:

sending a notification signal to notify the determined game machine of said predetermined game machine group that said return will be executed or that said return was executed.

15. The method according to claim 11, wherein the return is executed to the one game machine, which has been selected by the lottery in said predetermined game machine group, after confirming that the one game machine is in play.

16. A game server for collectively controlling a plurality of game machine groups installed in a game center, said plurality of game machine groups including a first game machine group and a second game machine group respectively including a plurality of game machines, each of which is brought into a status enabling to start a game based on a thrown coin or a given credit number and is given a payout according to a result of said game, said game server including:

a memory configured to individually store cumulative credit consumptions of each of said plurality of game machine groups, wherein said memory has a plurality of units for each of said game machine groups respectively storing a cumulative credit consumption of each of said game machine groups;

a processing unit that judges whether a cumulative credit consumption of a predetermined game machine group reaches a predetermined upper limit, based on information stored in said memory, and that executes a return at a time point depending on a game condition of one game machine of said predetermined game machine group, after a completion of a lottery to select the one game machine where the return is to be executed; and a communication interface that sends, when said processing unit judges that said cumulative credit consumption of said predetermined game machine group reaches the predetermined upper limit, a return signal for executing said return based on a predetermined return rate, to the one game machine of said predetermined game machine group, said return being executed regardless of a game result, wherein at least one of the predetermined upper limit and the predetermined return rate is individually set for each of said plurality of game machine groups and wherein the game machines in the first game machine group are different from the game machines in the second game machine group.

* * * * *